(12) United States Patent
Schlosser et al.

(10) Patent No.: US 10,823,286 B2
(45) Date of Patent: Nov. 3, 2020

(54) PARKING INTERLOCK DEVICE, TRANSMISSION INCLUDING SAID PARKING INTERLOCK DEVICE, AND RELATED ASSEMBLY METHOD

(71) Applicant: ZF Friedrichshafen AG, Friedrichshafen (DE)

(72) Inventors: Tobias Schlosser, Ravensburg (DE); Tobias Miller, Waldburg (DE); Adalbert Schoida, Oberteuringen (DE); Michael Linkens, Lindau (DE); Matthias List, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 9 days.

(21) Appl. No.: 16/275,452

(22) Filed: Feb. 14, 2019

(65) Prior Publication Data

US 2019/0257422 A1    Aug. 22, 2019

(30) Foreign Application Priority Data

Feb. 16, 2018  (DE) .......................... 10 2018 202 370

(51) Int. Cl.
*F16H 63/34* (2006.01)
(52) U.S. Cl.
CPC ................ *F16H 63/3433* (2013.01)
(58) Field of Classification Search
CPC ... F16H 63/3433; F16H 63/48; F16H 63/3416
See application file for complete search history.

(56) References Cited

U.S. PATENT DOCUMENTS

| 5,704,457 A * | 1/1998 | Kimura ................. B60K 37/06 192/220.2 |
| 6,481,556 B1 | 11/2002 | Haupt |
| 9,732,850 B2 | 8/2017 | Spooner et al. |

(Continued)

FOREIGN PATENT DOCUMENTS

| DE | 19837832 A1 | 2/2000 |
| DE | 102014223037 A1 | 5/2016 |

(Continued)

OTHER PUBLICATIONS

German Search Report DE102018202370.0 dated Oct. 24, 2018. (14 pages).

*Primary Examiner* — David J Hlavka
(74) *Attorney, Agent, or Firm* — Dority & Manning, P.A.

(57) ABSTRACT

An actuating device (19) for manually releasing a parking lock device (9) of a transmission (1) includes a manual actuator (18) and a pivotably mounted actuating shaft (20). The actuating shaft (20) includes a shaft outer section (20a), to which the manual actuator (18) is attached, and includes a shaft inner section (20b), on which a parking disk (15) is mounted. The parking disk (15) includes a recess (21), and on which an engaging piece is mounted, which includes a projection (23) engaging into the recess (21). The engaging piece is an engaging lever (22) which includes a foot section (22a) for mounting the engaging lever (22) on the shaft inner section (20b) of the actuating shaft (20), and includes the projection (23) on a head section (22b) positioned opposite a foot section (22a). An associated parking lock device (9), transmission (1), and assembly method are also provided.

15 Claims, 9 Drawing Sheets

(56) References Cited

U.S. PATENT DOCUMENTS

| | | |
|---|---|---|
| 10,166,955 B2 | 1/2019 | Tateno et al. |
| 2014/0231212 A1* | 8/2014 | Kayukawa .......... F16H 63/3433 |
| | | 192/219.4 |
| 2014/0346004 A1* | 11/2014 | Landino .................. B60T 1/005 |
| | | 192/219.5 |
| 2015/0362069 A1* | 12/2015 | Gross .................. F16H 63/3433 |
| | | 192/219.6 |

FOREIGN PATENT DOCUMENTS

| | | |
|---|---|---|
| DE | 102017219208 A1 | 5/2018 |
| GB | 2501600 A | 10/2013 |

\* cited by examiner

PARKING INTERLOCK DEVICE, TRANSMISSION INCLUDING SAID PARKING INTERLOCK DEVICE, AND RELATED ASSEMBLY METHOD

FIELD OF THE INVENTION

The present invention relates generally to an actuating device for manually releasing a parking lock device of a transmission, in particular, an automatic transmission of a motor vehicle. The invention also relates to a parking lock device and a transmission, in particular, an automatic transmission of a motor vehicle, including such an actuating device. The invention also relates to an associated method for assembling an actuating device.

BACKGROUND

DE 198 37 832 A1 describes a parking lock, in particular, for automatic transmissions of motor vehicles, which locks or releases the automatic transmission on the basis of an actuating signal triggered by the driver via an operating unit, in that a parking pawl is moved with the aid of a device including disks and including a detent in connection with an actuating device consisting of a piston, a cylinder, and a recoil spring. The parking pawl can be moved manually via an operative connection from within a vehicle compartment or hydraulically with the aid of an actuating device, wherein a parking pawl disengages due to a rotation of a device about its central axis resulting from pressure applied via an actuating device and, in so doing, a detent is brought into a disengaged condition and, due to a switch of an actuating device to a non-pressurized condition, a device is rotated about its central axis in the opposite direction and, as a result, the parking pawl engages.

SUMMARY OF THE INVENTION

Example aspects of the present invention provide an actuating device for manually releasing a parking lock device, which is improved as compared to the prior art. The actuating device is to enable operation of an associated parking lock device in a manner which is undisturbed by the actuating device, in particular, while avoiding undesirable and, possibly, harmful interactions and/or loads. In addition, in particular, a possibly improper manual actuation of the actuating device should not result in damage to the associated parking lock device.

The actuating device for manually releasing a parking lock device of a transmission, in particular, an automatic transmission of a motor vehicle, includes a manual actuator arranged outside a transmission housing of the transmission in the installed condition of the actuating device, and a pivotably mounted actuating shaft penetrating a housing wall of the transmission housing in the installed condition of the actuating device. The actuating shaft includes a shaft outer section arranged outside the transmission, to which the manual actuator is attached, and includes a shaft inner section arranged within the transmission housing, on which a parking disk is mounted. The parking disk includes a recess. An engaging piece, which includes a projection engaging into the recess of the parking disk, is mounted on the parking disk. The engaging piece is designed as an engaging lever which includes a foot section, with the aid of which the engaging lever is mounted on the shaft inner section of the actuating shaft, and includes the projection on the head section of the actuating shaft positioned opposite the foot section.

In order to be able to release a parking lock device even without hydraulic pressure or a power supply, which may be the case, for example, during assembly of the vehicle, in the event of a fault, in the event that the vehicle breaks down, or in the event of an accident involving the vehicle, a mechanical release device of the parking lock, which is at least partially external to the transmission, is provided. With the aid of the present actuating device which therefore forms a release device, the parking lock may be manually released by overcoming an engaging spring preload.

Due to a usual rigid connection of the at least partially external actuating device, in particular, due to the external manual actuator and the, in particular, completely internal parking lock device, the actuating device moves along with the internal automatic switching operations of the parking lock device. Due to the position of the manual actuator outside the transmission interior space, the inner region must be protected by way of suitable measures in the transmission. If this is not the case, the automatic parking lock function can be influenced by contamination during operation. In the worst case, an automatic engagement of the parking lock is prevented by way of a blocking of the mechanism from the outside, which results in an unsafe operating condition. In order to ensure that the parking lock functions faultlessly, it is important that the parking lock mechanism is not influenced, or is only minimally influenced, from the outside. The reason therefor is, for example, that the engagement spring is suitable only for the internal functional components, in the ideal case. External influences are difficult to take into account, due to changing applications, and would take up valuable installation space. If excessive external friction, for example, due to a sluggish or aged control cable, would inhibit the movement of the parking lock mechanism, it would be conceivable that an engagement of the parking lock would be prevented or at least considerably delayed.

The solution of the described problems is, on the one hand, to decouple the internal automatic parking lock device and the manual actuating device, in particular, the external manual actuator of the manual actuating device, to such an extent that the external manual actuating device, in particular, the external manual actuator of the manual actuating device, does not move with the internal automatic parking lock device during internal automatic switching operations from "parking lock engaged" to "parking lock disengaged", but the function of a manual release with the aid of the manual actuating device, which is required in emergencies, is nevertheless not limited or even prevented in a use case.

Due to the fact that the engaging piece is designed as an engaging lever which includes a foot section, with the aid of which the engaging lever is mounted on the shaft inner section of the actuating shaft, and includes the projection on the head section of the actuating shaft positioned opposite the foot section, the engaging lever is largely decoupled from the parking disk and only the head section, via the projection, engages into the recess of the parking disk. Due to a slim design of the engaging lever, there is only a slight risk of contact with the adjacent surface of the parking disk in the axial direction as well.

The projection may be designed to be offset from the plane of the engaging lever, in particular, of the foot section of the engaging lever, by way of a bent portion. This means, the projection is designed to be integral with the engaging lever, which brings about a particularly stable connection of the projection to the engaging lever and guides the forces to be transmitted in a favorable way. Due to the bent portion of the projection, the projection can, on the one hand, also be easily inserted and secured on the parking disk in a form-fit manner during assembly.

The engaging lever may be designed as a bent sheet-metal part, in particular, as a stamped and bent sheet-metal part, in the case of which the projection is formed by a bent-over end section of the head section of the engaging lever. Thus, the engaging lever can be manufactured particularly cost-effectively and the number of parts can be reduced.

The recess may include a longitudinally extending channel, which extends in the circumferential direction across a sector within the parking disk and transitions into a radially extending insertion channel, which results in the recess of the parking disk being open at the edge, in such a way that the projection of the engaging lever may be fitted into the longitudinally extending channel of the recess, via the insertion channel, in a radial insertion direction. Due to the fact that the recess is designed to include an insertion channel, a particularly simple assembly can take place, due to the fact that the engaging lever can be easily slipped over a sleeve section of the parking disk and/or over an actuating shaft of the actuating device in a radial direction and, simultaneously, the projection enters the recess of the parking disk without the need for any particular further assembly-related handling steps in order to additionally insert, via an extra step, the projection into the recess of the parking disk, for example, by way of an axial insertion movement, separately from or in addition to slipping the engaging lever over the sleeve section and/or over the actuating shaft.

The foot section of the engaging lever may therefore include a bearing eye which is designed for the pivotable mounting of the engaging lever on the actuating shaft and/or on a sleeve section of the parking disk, wherein the bearing eye is designed to be open at the edge, by way of a radially extending mounting channel in the foot section of the engaging lever, in such a way that the engaging lever can be slipped over the actuating shaft and/or over the sleeve section of the parking disk in a radial mounting direction with the aid of the mounting channel. The bearing eye forms a plain-bearing seat of the engaging lever, with the aid of which the engaging lever is pivotably mounted on the sleeve section of the parking disk and/or on the actuating shaft. The bearing eye is designed to be open at the edge in this case due to the radially extending mounting channel, and so the sleeve section of the parking disk or the actuating shaft can enter the bearing eye through the mounting channel when the engaging lever is radially installed.

The bearing eye may include a first radial wall surface facing the actuation direction and a second radial wall surface, wherein the two radial wall surfaces are designed for rotationally supporting the engaging lever on two opposed sleeve flattenings of the sleeve section of the parking disk corresponding to the radial wall surfaces of the engaging lever. Therefore, if the manual actuator is moved, i.e., pivoted, the actuating shaft then pivots within the sleeve section and carries the engaging lever along. For this purpose, the bearing eye includes two opposed internal-shell wall surfaces aligned in parallel to one another, wherein the two internal-shell wall surfaces are designed for rotationally supporting the engaging lever on two opposed shaft flattenings of the actuating shaft corresponding to the internal-shell wall surfaces of the engaging lever. Thus, the engaging lever rotates along with the actuating shaft until the two radial wall surfaces of the bearing eye rest against the corresponding, opposed sleeve flattenings of the sleeve section of the parking disk and, in this way, carry the parking disk along.

Therefore, the engaging lever may be seated directly on the sleeve section of the parking disk or directly on the actuating shaft.

The engaging lever may include a disengagement safeguard which is designed for securing the engaging lever—in a condition of the engaging lever slipped over the sleeve section of the parking disk and/or over the actuating shaft—against unintentional disengagement, in a radial direction, from the sleeve section of the parking disk and/or from the actuating shaft. In a first embodiment of the disengagement safeguard, a barb for securing the engaging lever may be provided, for example, on the internal-shell wall surface. In a second embodiment of the disengagement safeguard, a leg of the engaging lever, which is inserted into a hole in the parking disk and is slid therein, in a form-fit manner, in the manner of a lever, may secure the engaging lever. In a third embodiment of the disengagement safeguard, a securing of the engaging lever may take place by way of an insertion of the connecting rod.

The actuating device may include an overload spring arranged outside the transmission, which is designed for resiliently coupling the projection of the engaging lever via the overload spring to the parking disk when the manual actuator is moved in the manual release direction of the parking lock device.

Alternatively, the actuating device may include an overload spring arranged within the transmission, which is designed for resiliently coupling the projection of the engaging lever via the overload spring to the parking disk when the manual actuator is moved in the manual release direction of the parking lock device.

Regardless of whether the overload spring is arranged outside the transmission or within the transmission, it can be achieved, by way of an integration of such an overload safeguard between the manual actuating device and the internal automatic parking lock device, that the inner automatic parking lock device is not overloaded and, therefore, is not damaged in the event that a defined, i.e., predefined actuating travel of the manual actuating device is exceeded.

The overload spring may be a bending spring including a spring bending section and two spring legs, wherein the spring bending section is guided around the sleeve section of the parking disk and/or around the actuating shaft at least over a partial circumference, and one of the two spring legs extends up to the recess, in particular, extends into the recess, in such a way that the projection of the engaging lever rests against this spring leg in the event of a manual movement of the manual actuator. The overload spring may be arranged on the parking disk in such a way, in particular, that the projection of the engaging lever rests against a front-end of a spring wire of the overload spring as soon as the overload range, in particular, the overload travel, has been reached. In the event that a manual actuation proceeds even further, the projection pushes, on face end, against the spring wire of the overload spring, whereby the spring bending section is deformed and a spring force is built up. Since the recess still offers sufficient space, and so the projection would not already rest against an edge of the recess here, the projection can move and, therefore, deform the overload spring without the parking disk being rotated further. In the end, the connecting rod is not moved further, either, since the parking disk does not rotate.

The problem is also solved by a parking lock device including:
- an interlocking element displaceably mounted on a connecting rod, which is designed for moving a parking pawl of a transmission, in particular, an automatic transmission of a motor vehicle, in such a way that, in an engaged condition of the parking lock device, the parking pawl engages into a tooth system of a parking interlock gear of the transmission in a form-fit manner and, in a disengaged condition of the parking lock device, the parking pawl is disengaged from the tooth system,
- an interlocking element adjusting spring arranged on the connecting rod, preloading the interlocking element in an engagement direction into the engaged condition of the parking lock device,
- an engagement spring pressing the connecting rod into the engaged condition of the parking lock device in the engagement direction of the interlocking element,
- an actuator which is designed for moving, upon activation thereof, the connecting rod counter to the engagement direction in order to bring the interlocking element into the disengaged condition of the parking lock device, and including
- an actuating device, which including a parking disk, wherein the parking disk is designed for coupling the actuator to the connecting rod in a condition of the actuating device mounted on the parking lock device.

The parking lock device is therefore equipped with an appropriate actuating device. A coupling of the actuating device to the parking lock device takes place via the parking disk. Therefore, the parking disk can be considered, on the one hand, part of the parking lock device and, on the other hand, part of the manual actuating device.

The problem is also solved by a transmission, in particular, an automatic transmission of a motor vehicle, including a transmission housing, a parking interlock gear mounted in the transmission housing, which includes a tooth system, a parking pawl movably mounted in the transmission housing, which is designed for engaging into the tooth system of the parking interlock gear in an engaged condition of the parking lock device, in order to lock the transmission, and including a parking lock device actuating the parking pawl as described.

The method for assembling an actuating device according to one or several of the described embodiments includes the steps of:
- slipping an engagement spring pushing the parking disk into the engaged condition of the parking lock device in the engagement direction of the interlocking element onto a sleeve section of the parking disk,
- inserting the parking disk, together with the installed engagement spring, between two bearing seats of a transmission housing of a transmission including a parking lock device until the sleeve section of the parking disk is aligned with the two bearing seats in such a way that an actuating shaft of the actuating device is insertable through the two bearing seats and the sleeve section of the parking disk,
- inserting the actuating shaft connected to the manual actuator into the two bearing seats and the sleeve section of the parking disk from outside the transmission housing in such a way that the manual actuator is positioned outside the transmission housing,
- radially slipping an engaging lever of the actuating device over a shaft inner section of the actuating shaft arranged within the transmission housing, and
- securing the engaging lever on the shaft inner section of the actuating shaft arranged within the transmission housing against unintentional disengagement, in a radial direction, from the sleeve section of the parking disk and/or from the actuating shaft.

BRIEF DESCRIPTION OF THE DRAWINGS

Specific exemplary embodiments of the invention are explained in greater detail in the following description of the figures with reference to the attached figures. Specific features of these exemplary embodiments can also be general features of the invention, regardless of the specific context in which they are mentioned, also, if necessary, individually or in other combinations of the features.

In the figures.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
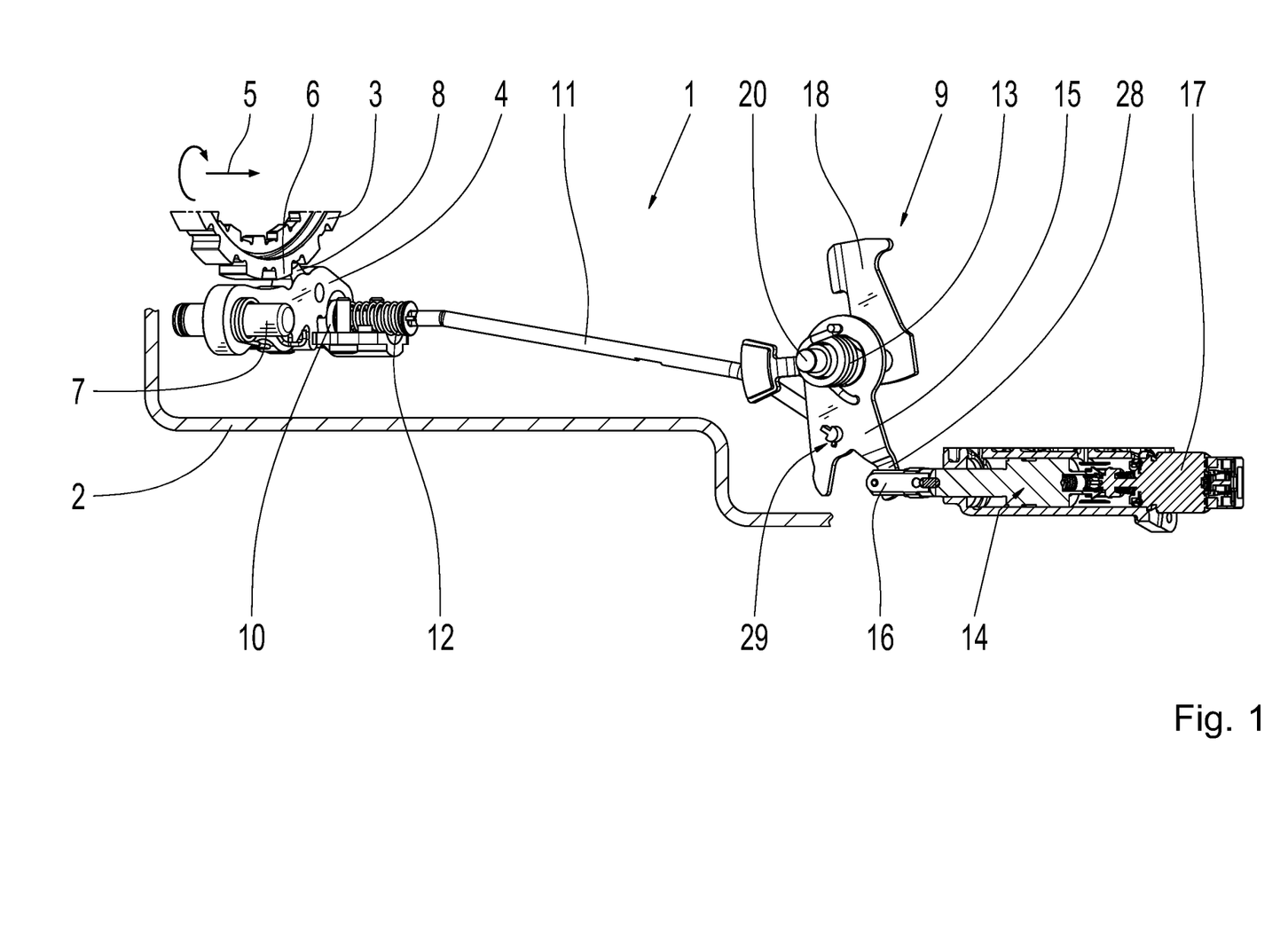
FIG. 1 shows a perspective part view of one exemplary embodiment of a parking lock device in its engaged condition, in the interior of an automatic transmission of a motor vehicle.

The automatic transmission of a motor vehicle represented in sections in FIG. 1 includes, in addition to other components of the transmission 1, a transmission housing 2, as well as a parking interlock gear 3 and a parking pawl 4. In the case of the present exemplary embodiment, the parking interlock gear 3 is connected to an output shaft 5 of the transmission 1. The output shaft 5 is designed for driving the wheels of at least one chassis axle of the motor vehicle (not represented). In order to implement a parking lock function on the motor vehicle, the parking pawl 4, which is pivotably mounted on the transmission housing 2, meshes or engages, in an engaged condition, into a tooth system 6 of the parking interlock gear 3 in a form-fit manner in such a way that the parking interlock gear 3 is secured against rotation with the aid of the parking pawl 4. Due to such a securing of the parking interlock gear 3 against rotation, the output shaft 5 connected to the parking interlock gear 3 is therefore also blocked from rotating, i.e., the output shaft 5 is secured against rotation.

The parking pawl 4 is pivotably mounted in the transmission housing 2 with the aid of a latch bolt 7 in this case, in such a way that the parking pawl 4 may be moved back and forth between an engaged interlock position, in which a ratchet tooth 8 of the parking pawl 4 engages in a form-fit manner between two teeth of the tooth system 6 of the parking interlock gear 3, and a disengaged release position, in which the ratchet tooth 8 of the parking pawl 4 is disengaged from the tooth system 6 of the parking interlock gear 3.

The movement, i.e., a displacement of the parking pawl 4 between the engaged interlock position and the disengaged release position takes place with the aid of a parking lock device 9. For this purpose, the parking lock device 9 includes, inter alia, an interlocking element 10 which appropriately moves or displaces the parking pawl 4.

The parking lock device 9 is designed for positioning the parking pawl 4 with the aid of its interlocking element 10 in an engaged condition of the parking lock device 9 in such a way that the ratchet tooth 8 of the parking pawl 4 engages into the tooth system 6 of the parking interlock gear 3 and therefore locks the transmission 1, in that the parking pawl 4 locks the output shaft 5 via the parking interlock gear 3.

In the case of the present exemplary embodiment, the parking lock device 9 includes an interlocking element 10 displaceably mounted on a connecting rod 11, which is designed for moving the parking pawl 4 of the transmission 1 in such a way that, in an engaged condition of the parking lock device 9, the parking pawl 4 engages into the tooth system 6 of the parking interlock gear 3 of the transmission 1 in a form-fit manner and, in a disengaged condition of the parking lock device 9, the parking pawl 4 is disengaged from the tooth system 6. The parking lock device 9 also includes an interlocking element adjusting spring 12 arranged on the connecting rod 11, preloading the interlocking element 10 in an engagement direction into the engaged condition of the parking lock device 9, and an engagement spring 13 pressing the connecting rod 11 into the engaged condition of the parking lock device 9 in the engagement direction of the interlocking element 10.

An actuator 14 is designed for moving, upon activation thereof, the connecting rod 11, which is coupled to an actuating element 16 of the actuator 14 via a parking disk 15, counter to the engagement direction in order to bring the interlocking element 10 into the disengaged condition of the parking lock device 9. In the case of the present exemplary embodiment, a detent device 17 is additionally connected to the actuator 14, which is designed for electromechanically locking the actuator 14 in the disengaged condition of the parking lock device 9.

The parking lock device 9 also includes an actuating device 19 as described, the manual actuator 18 of which is shown in FIG. 1. The parking disk 15 can therefore be considered, on the one hand, part of the parking lock device 9 and, on the other hand, part of the actuating device 19. The parking disk 15 therefore forms a mechanical interface of the parking lock device 9 and the actuating device 19. The parking disk is therefore designed, in a condition of the actuating device 19 mounted on the parking lock device 9, for coupling the actuator 14 as well as the manual actuator 18 to the connecting rod 11.

The actuating device 19 shown in FIG. 2 through FIG. 11 includes the manual actuator 18 arranged outside the transmission housing 2 in the installed condition of the actuating device 19.

Figure 2:
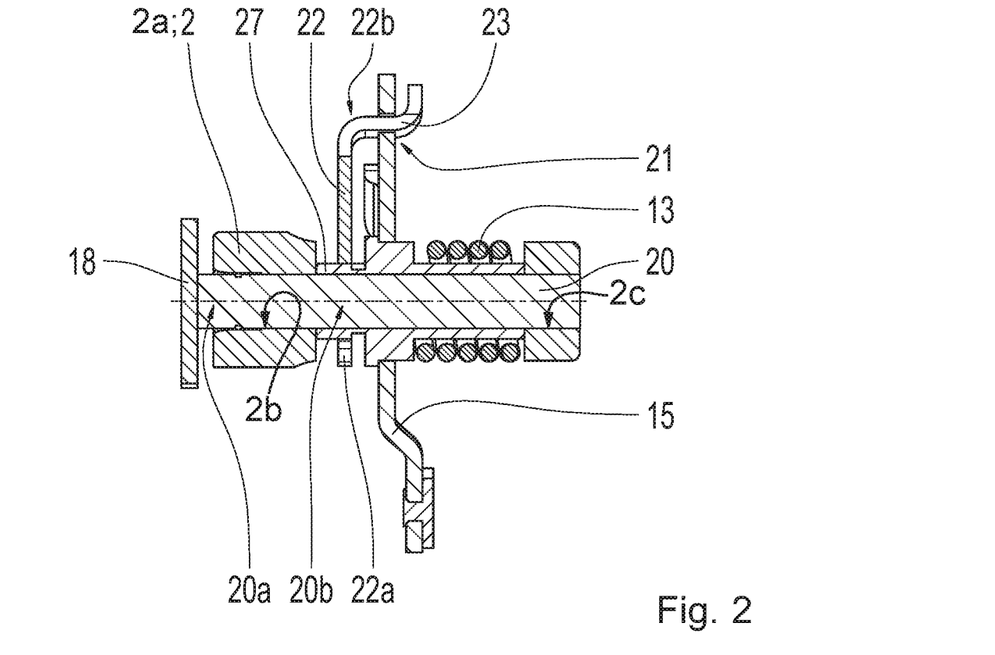
FIG. 2 shows a section through a first embodiment of an actuating device, in which a manual actuator is mounted on a sleeve of the parking disk.
Figure 3:
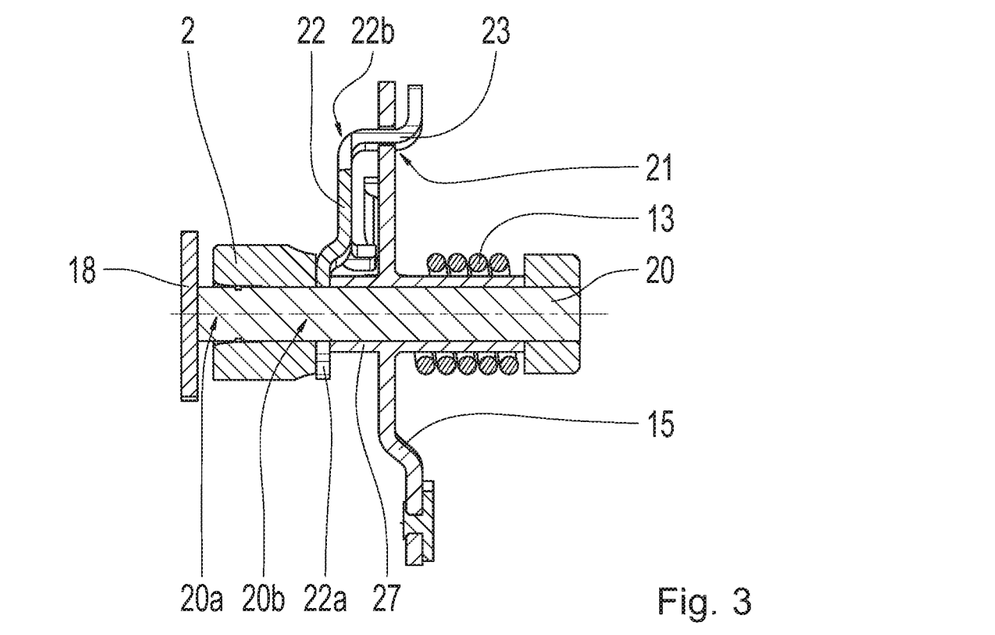
FIG. 3 shows a section through a second embodiment of an actuating device, in which the manual actuator is mounted directly on an actuating shaft.

The actuating device 19 includes a pivotably mounted actuating shaft 20 penetrating a housing wall 2a of the transmission housing 2 in the installed condition of the actuating device 19. The actuating shaft 20 includes a shaft outer section 20a arranged outside the transmission housing 2, to which the manual actuator 18 is attached, and includes a shaft inner section 20b arranged within the transmission housing 2, on which the parking disk 15 and an engaging lever 22 are mounted. That section of the housing wall 2a which is penetrated by the actuating shaft 20 simultaneously forms a first bearing seat 2b for the actuating shaft 20. A second bearing seat for the actuating shaft 20, which is arranged in the interior space of the transmission housing 2, is marked with 2c. The parking disk 15 includes a recess 21. The engaging lever 22 includes a projection 23 engaging into the recess 21 of the parking disk 15.

The engaging piece is designed as an engaging lever 22 which includes a foot section 22a, with the aid of which the engaging lever 22 is mounted on the shaft inner section 20b of the actuating shaft 20, and includes the projection 23 on the head section 22b positioned opposite the foot section 22a.

As is apparent, in particular, in FIG. 2 and FIG. 3, the projection 23 is offset from the plane of the engaging lever 22, in particular, of the foot section 22a of the engaging lever 22, by way of a bent portion. In the case of the represented exemplary embodiment, the engaging lever 22 is designed as a bent sheet-metal part, in particular, as a stamped and bent sheet-metal part, in the case of which the projection 23 is formed by a bent-over end section of the head section 22b of the engaging lever 22.

As is apparent, in particular, in FIG. 4 through FIG. 7, the recess 21 of the parking disk 15 includes a longitudinally extending channel 24, which extends in the circumferential direction across a sector within the parking disk 15 and transitions into a radially extending insertion channel 25, which results in the recess 21 of the parking disk 15 being open at the edge, in such a way that the projection 23 of the engaging lever 22 can be fitted into the longitudinally extending channel 24 of the recess 21, via the insertion channel 25, in a radial insertion direction.

Figure 5:
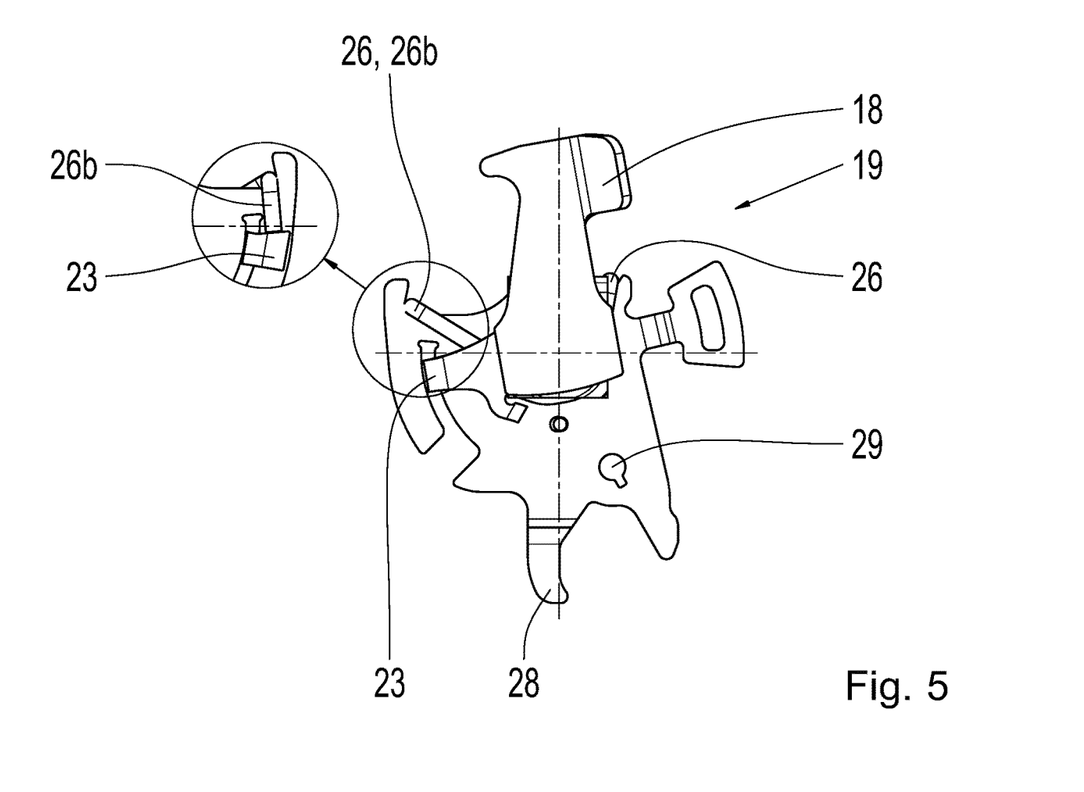
FIG. 5 shows a side view of the exemplary actuating device according to FIG. 2 in an automatically engaged condition of the parking lock device.
Figure 6:
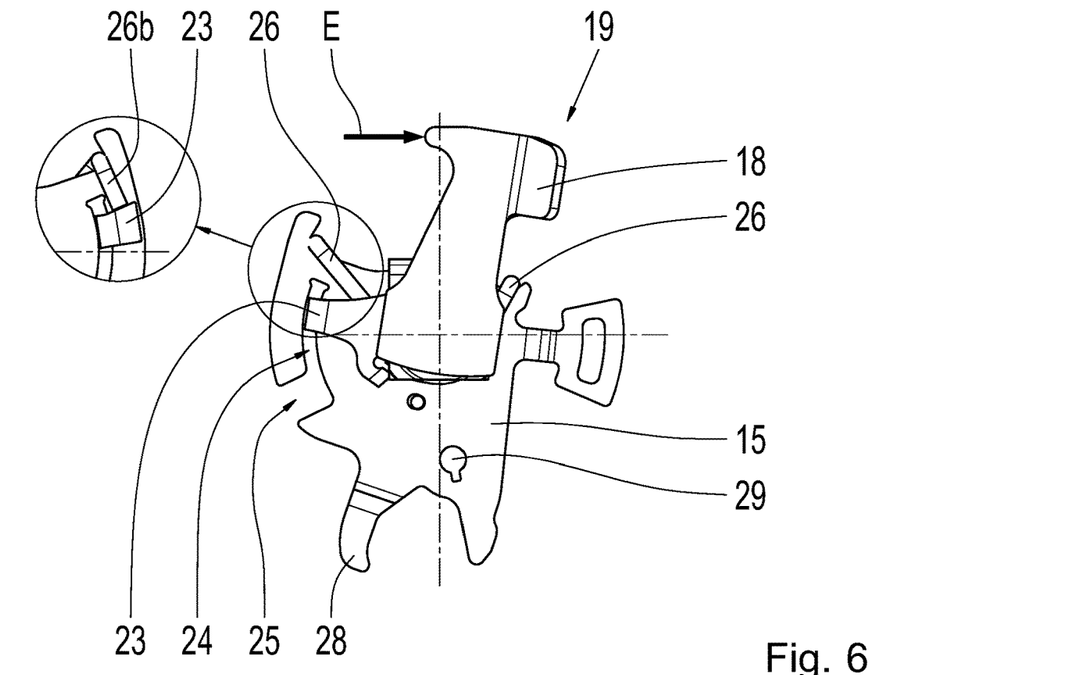
FIG. 6 shows a side view of the exemplary actuating device according to FIG. 2 in a condition of having been manually disengaged with the aid of the manual actuator.
Figure 7:
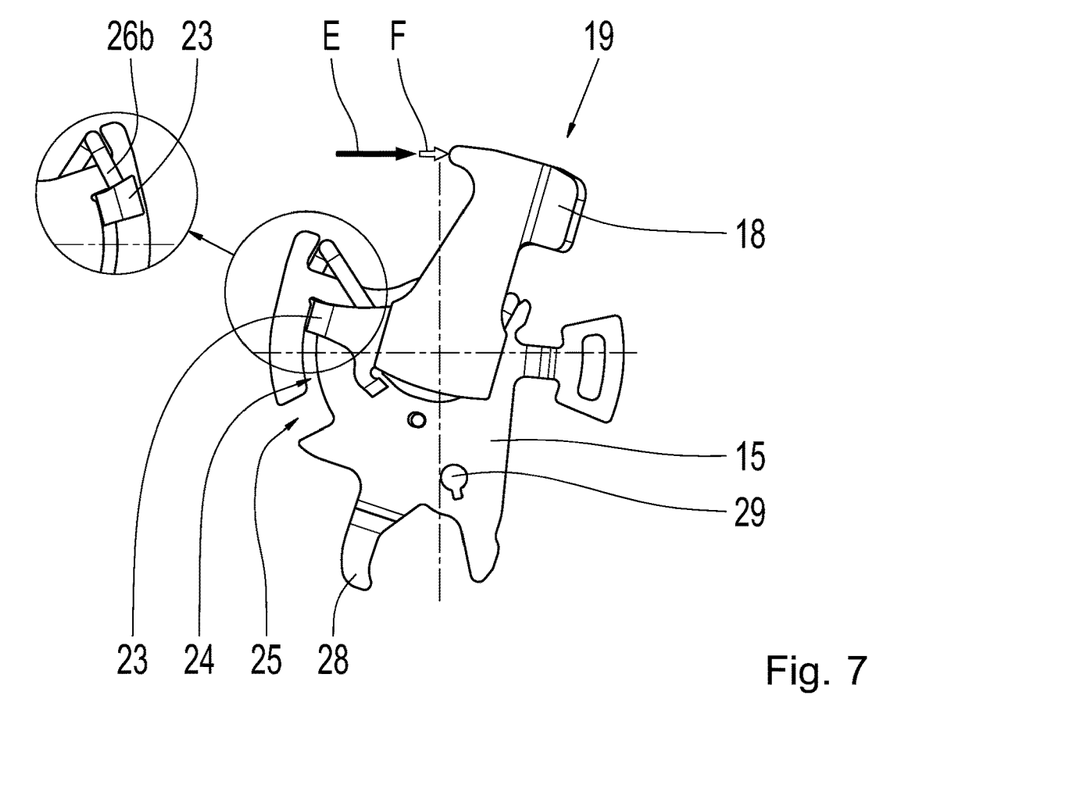
FIG. 7 shows a side view of the exemplary actuating device according to FIG. 2 in a condition of having been manually disengaged with the aid of the manual actuator and overcompressed, in which an overload spring of the actuating device is tensioned.

FIG. 5 through FIG. 8 show an overload spring 26 which, in the case of the represented exemplary embodiment, is arranged within the transmission 1 and is designed for resiliently coupling the projection 23 of the engaging lever 22 to the parking disk 15 via the overload spring 26 when the manual actuator 18 is moved in the manual release direction E (FIG. 6 and FIG. 7) of the parking lock device. In the condition of the actuating device 19 according to FIG. 6, the manual actuator 18 is in the regularly actuated position, in which the parking lock device 9 has been manually correctly disengaged. The overload spring 26 is preloaded in the non-actuated condition, and so, during normal operation, i.e., during operation without overload, the overload spring 26 forms the support of the engaging lever 22. With regard to its preload, the overload spring 26 is designed in such a way that a manual actuation of the parking lock release device is possible in all operating conditions of the motor vehicle. If the manual actuator 18 is moved too far, in the sense of an overload, as indicated in FIG. 7 by the additional arrow F, the projection 23 of the engaging lever 22 pushes, on face end, against an end section of the overload spring 26, whereby the overload spring 26 is moved in such a way that the parking disk 15 is not rotated any further. Instead, the overload spring 26 is merely tensioned.

Figure 8:
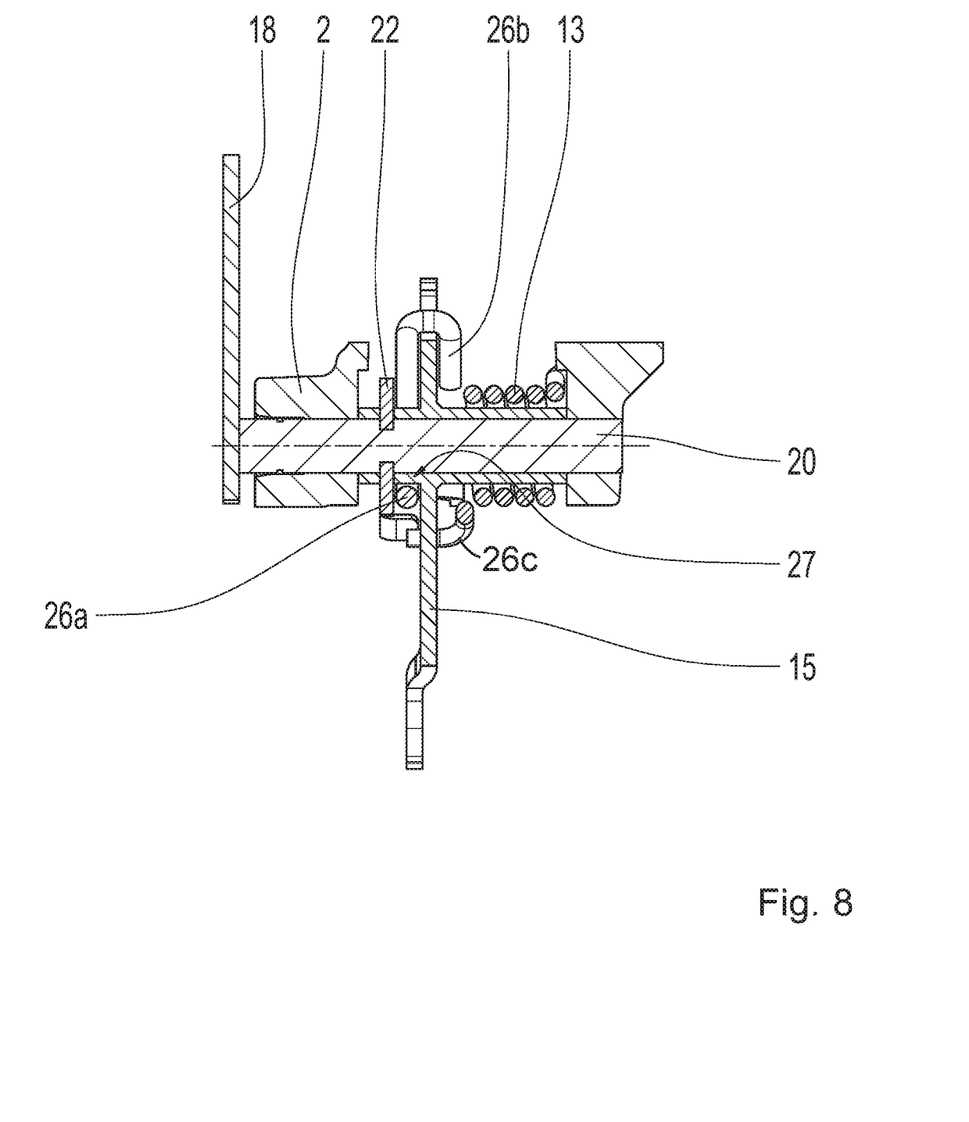
FIG. 8 shows a sectioning of the actuating device including an overload spring in an installed position on the two bearing seats of a housing of the transmission.

As represented in FIG. 8, the overload spring 26 can be a bending spring including a spring bending section 26a and two spring legs 26b, 26c, wherein the spring bending section 26a is guided around a sleeve section 27 of the parking disk 15 and around the actuating shaft 20 at least over a partial circumference, and one of the two spring legs 26b, 26c extends up to the recess 21, in particular, extends into the recess 21, in such a way that the projection 23 of the engaging lever 22 rests against this spring leg 26b in the event of a manual movement of the manual actuator 18.

Figure 4:
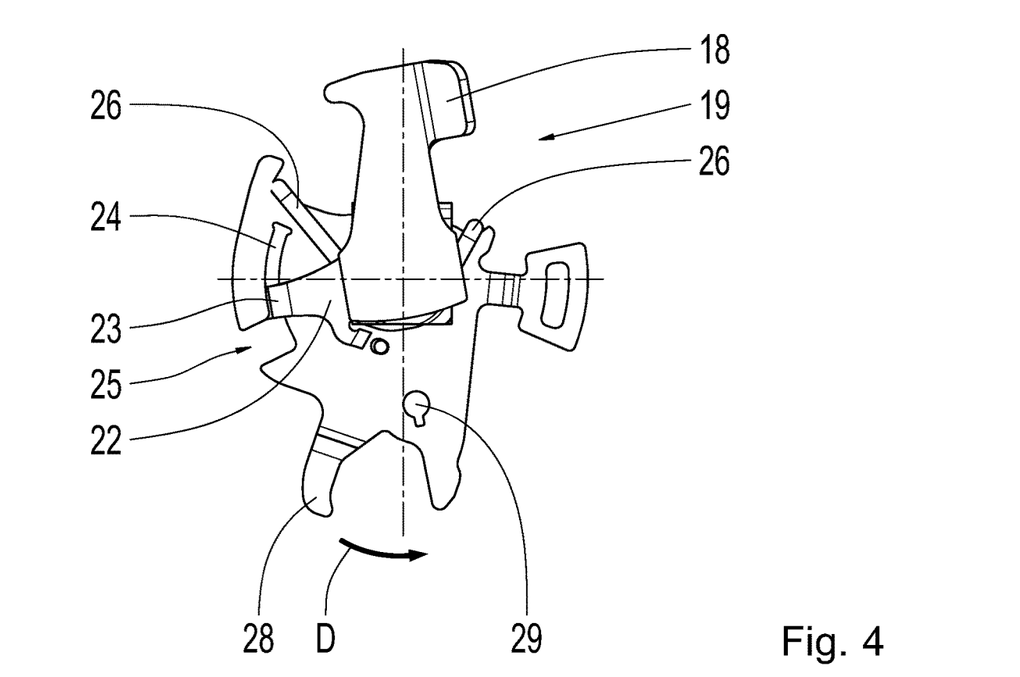
FIG. 4 shows a side view of the exemplary actuating device according to FIG. 2 in an automatically disengaged condition of the parking lock device.

In the representation according to FIG. 4, the actuating device 19 is in an automatically disengaged condition of the parking lock device 9. The parking disk 15 includes a leg 28, to which the actuating element 16 of the actuator 14 (FIG. 1) couples. The parking disk 15 also includes a bore hole 29, into which the connecting rod 11 of the parking lock device 9 (FIG. 1) couples. If the actuating element 16 of the actuator 14 moves the leg 28 in the arrow direction D out of the position of the parking disk 15 according to FIG. 4 into the position of the parking disk 15 according to FIG. 5, the parking disk 15 rotates counter clockwise and moves the connecting rod 11 accordingly, and so the parking lock device 9 is brought from the automatically disengaged condition according to FIG. 4 into the automatically engaged condition according to FIG. 5.

In the representation according to FIG. 5, the actuating device 19 is therefore in an automatically engaged condition of the parking lock device. In the automatically engaged condition, the projection 23 of the engaging lever 22 only barely rests against the front-end of the spring leg 26b of the overload spring 26, without preloading the overload spring 26. Alternatively, the projection 23 of the engaging lever 22 may barely not yet rest against the front-end of the spring leg 26b of the overload spring 26, i.e., the projection 23 may have a slight clearance from the spring leg 26b and form a slight gap. The positioning of the projection 23 of the engaging lever 22 relative to the spring leg 26b of the overload spring 26 is represented in greater detail in the enlarged rear view in FIG. 5. The manual actuator 18 is in a manually non-actuated position in FIG. 4 and in FIG. 5. In particular, in the automatically disengaged condition of the parking lock device 9 according to FIG. 4, which characterizes the driving operation, the projection 23 does not rest against an edge of the recess 21 or of the longitudinally extending channel 24 in either the clockwise direction or in the counter clockwise direction.

If, originating from the automatically engaged condition of the parking lock device 9 according to FIG. 5, the parking lock device 9 is manually released with the aid of the manual actuator 18, the manual actuator 18 is moved in the arrow direction E in the clockwise direction as represented in FIG. 6, whereby the projection 23 of the engaging lever 22 comes to rest against the front-end of the spring leg 26b of the overload spring 26, and the parking disk 15, originating from its position according to FIG. 5, manually rotates back into a position according to FIG. 4 (disengaged condition). The relative position of the engaging lever 22 and the parking disk 15, in the manually disengaged condition according to FIG. 6, is different, however, from the relative position of the engaging lever 22 and the parking disk 15 in the automatically disengaged condition according to FIG. 4. In FIG. 6, the projection 23 of the engaging lever 22, originating from the insertion channel 25 of the recess 21, extends further into the longitudinally extending channel 24 than in FIG. 4. In the representation according to FIG. 6, the actuating device 19 is therefore in a condition of having been manually disengaged with the aid of the manual actuator 18.

In the representation according to FIG. 7, the actuating device 19 is in a condition of having been manually disengaged with the aid of the manual actuator 18 and overcompressed, in which case the overload spring 26 of the actuating device 19 is tensioned. This means, the parking lock device 9 is in a manually disengaged condition. Therefore, the position of the parking disk 15 corresponds to the position of the parking disk 15 in FIG. 6. In FIG. 7, however, the projection 23 of the engaging lever 22, originating from the insertion channel 25 of the recess 21, extends even further into the longitudinally extending channel 24 than in FIG. 6. In this case, the spring leg 26b of the overload spring 26 is moved relative to the parking disk 15 and, therefore, no further turning motion is transmitted from the manual actuator 18 onto the parking disk 15. As is apparent by comparison in the two enlarged rear views of FIG. 6 and FIG. 7, only the projection 23 of the engaging lever 22 and the spring leg 26b of the overload spring 26 move upward, wherein the parking disk 15 retains its position. Therefore, the situation can be prevented in which the actuating device 19 is overloaded. An overloading of the actuating device 19 could result, for example, in a deformation of the actuating shaft 20 and, in this case, could also shift functional interface dimensions and position tolerances of the parking disk 15 mounted on the actuating shaft 20, and so the function of the parking lock device as specified would possibly no longer be given.

Figure 9:
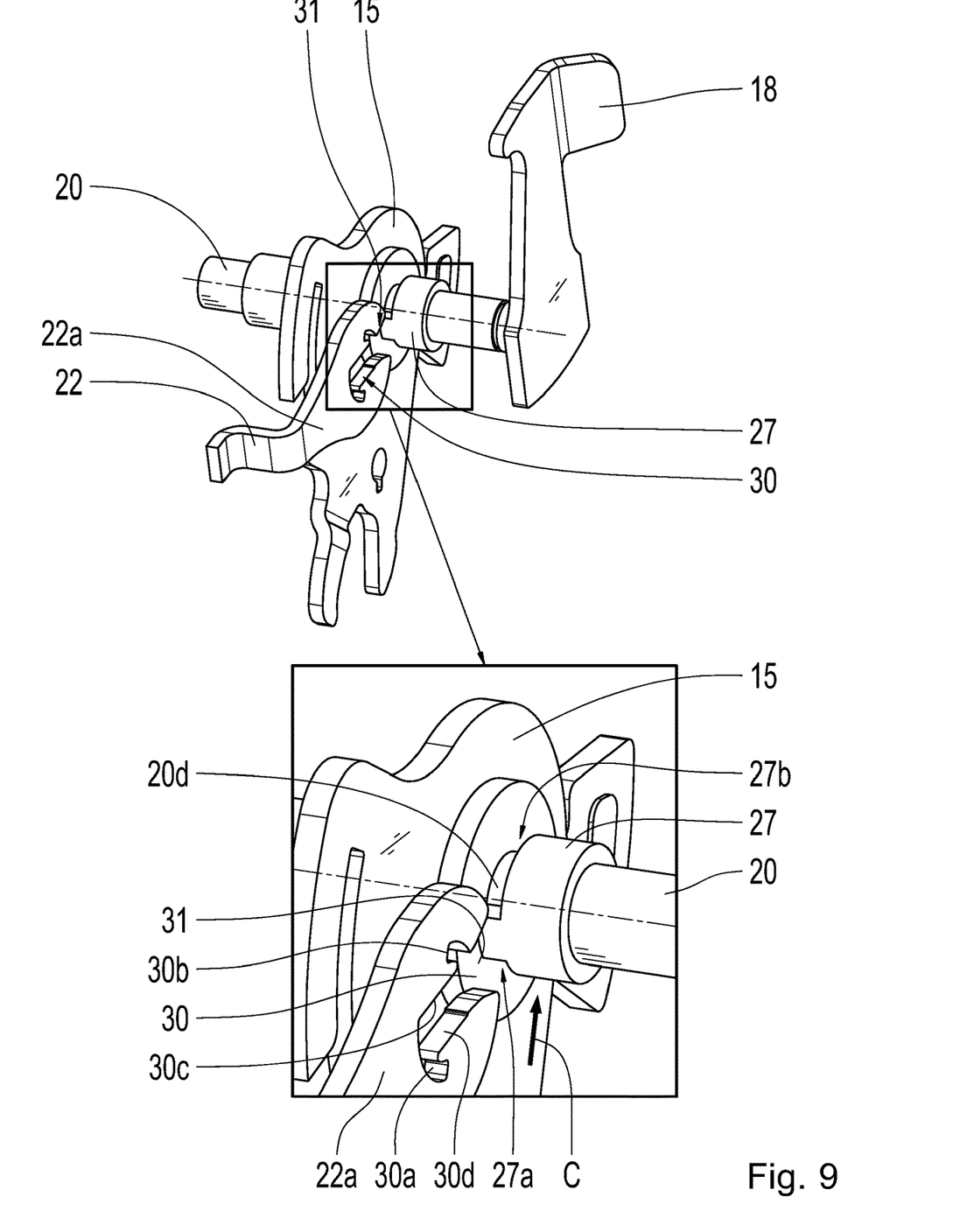
FIG. 9 shows a perspective representation of the actuating device according to FIG. 2 including an engaging lever during the process of being slipped over the actuating shaft and the sleeve section of the parking disk.

FIG. 9 shows an exemplary embodiment of how the foot section 22a of the engaging lever 22 may include a bearing eye 30. In the case of the present exemplary embodiment, the bearing eye 30 is designed for pivotably mounting the engaging lever 22 on the actuating shaft 20 and on the sleeve section 27 of the parking disk 15. The bearing eye 30 is designed to be open at the edge, by way of a radially extending mounting channel 31 in the foot section 22a of the engaging lever 22, in such a way that the engaging lever 22 can be slipped over the actuating shaft 20 and the sleeve section 27 of the parking disk 15 in a radial mounting direction with the aid of the mounting channel 31, as indicated by the arrow direction C.

The bearing eye 30 includes a first radial wall surface 30a facing the actuation direction and a second radial wall surface 30b, wherein the two radial wall surfaces 30a, 30b are designed for rotationally supporting the engaging lever 22 on two opposed sleeve flattenings 27a, 27b of the sleeve section 27 of the parking disk 15 corresponding to the radial wall surfaces 30a, 30b of the engaging lever 22.

In the case of the present exemplary embodiment, the bearing eye 30 also includes two opposed internal-shell wall surfaces 30c, 30d aligned in parallel to one another, wherein the two internal-shell wall surfaces 30c, 30d are designed for rotationally supporting the engaging lever 22 on two opposed shaft flattenings 20a, 20b of the actuating shaft 20 corresponding to the internal-shell wall surfaces 30c, 30d of the engaging lever 22.

Figure 10:
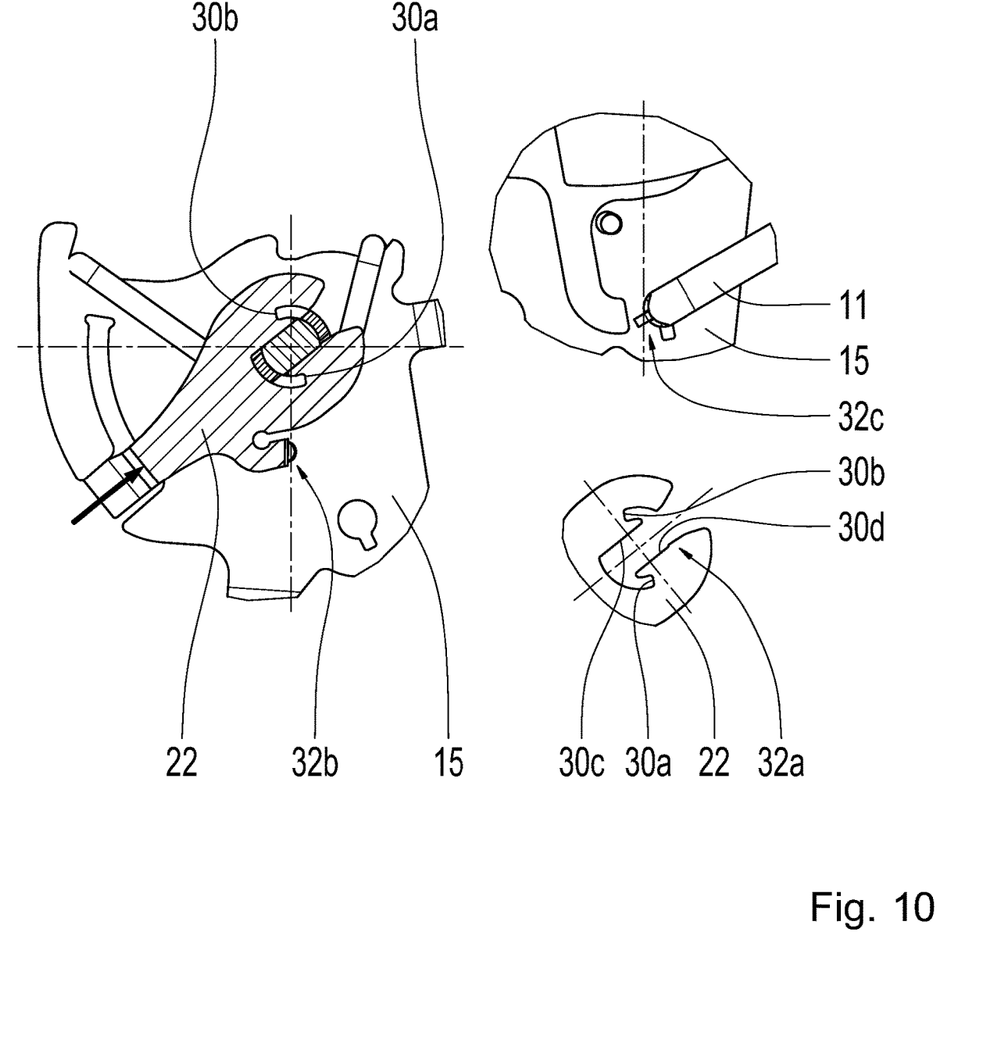
FIG. 10 shows schematics of actuating devices including variants of disengagement safeguards.

As shown in the variants of FIG. 10, the engaging lever 22 includes, in the case of the present exemplary embodiment, depending on the variant, a disengagement safeguard 32a, 32b, 32c which is designed for securing the engaging lever 22—in a condition of the engaging lever 22 having been slipped over the sleeve section 27 of the parking disk 15 and/or over the actuating shaft 20—against unintentional disengagement, in a radial direction, from the sleeve section 27 of the parking disk 15 and/or from the actuating shaft 20. In the case of the disengagement safeguard 32a, a barb for securing the engaging lever 22 is provided, for example, on the internal-shell wall surface 30d. In the case of the disengagement safeguard 32b, a leg of the engaging lever 22, which is inserted into a hole in the parking disk 15 and is slid therein, in a form-fit manner, in the manner of a lever, secures the engaging lever 22. In the case of the disengagement safeguard 32c, a securing of the engaging lever 22 takes place by way of the insertion of the connecting rod 11.

Figure 11:
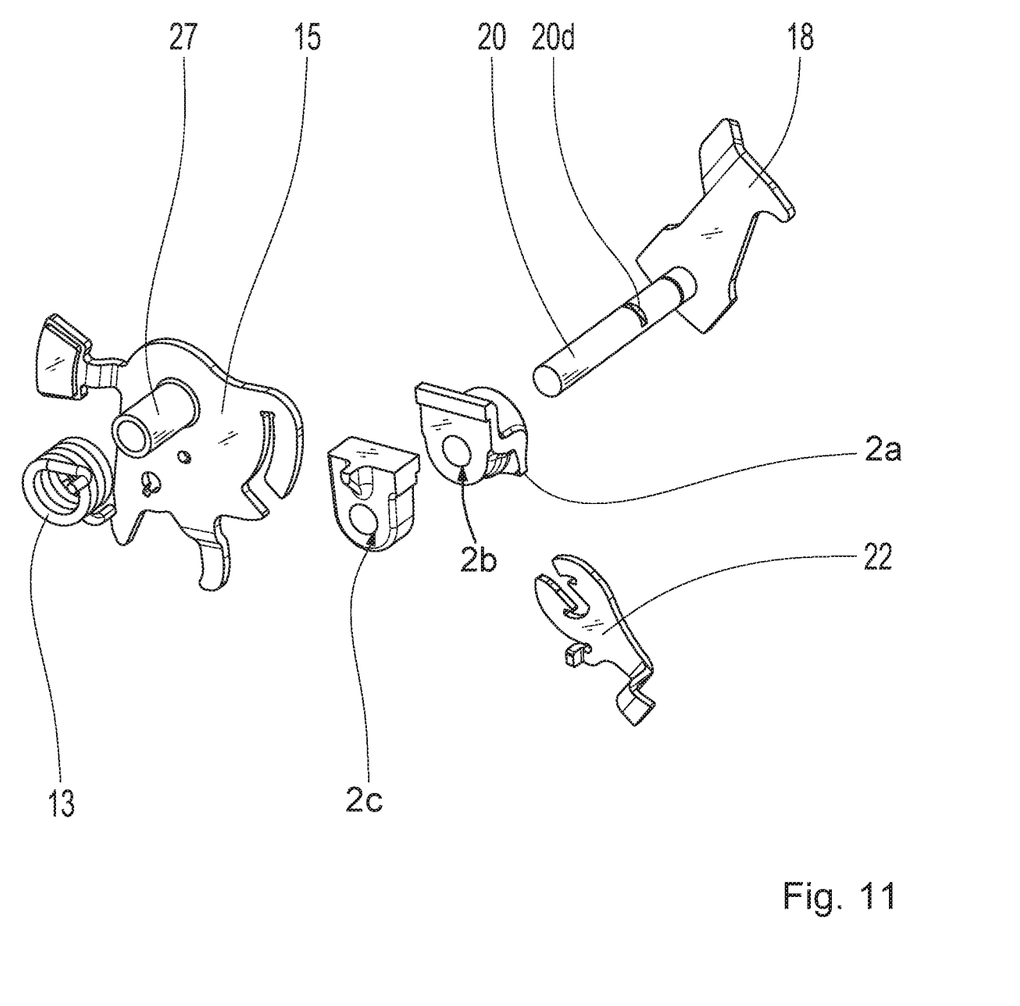
FIG. 11 shows a perspective exploded representation of the actuating devices according to FIG. 2 for illustrating the assembly method.
Figure 12:
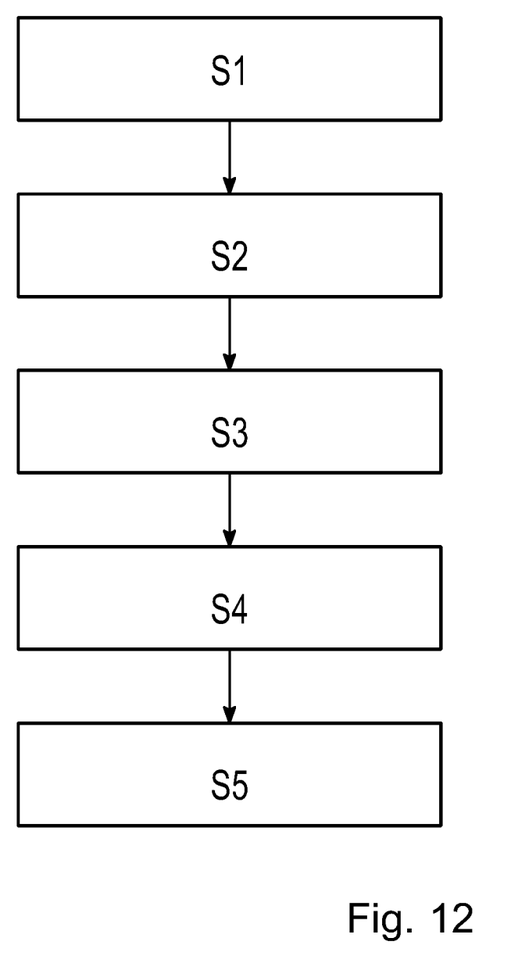
FIG. 12 shows a schematic of the assembly method.

FIG. 11, with the aid of an exploded representation, and FIG. 12, with the aid of a schematic, illustrate a method for assembling an actuating device as described. The method includes the steps described in the following.

Initially, in a first step S1, an engagement spring 13 pushing the parking disk 15 into the engaged condition of the parking lock device 9 in the engagement direction of the interlocking element 10 is slipped over the sleeve section 27 of the parking disk 15.

Thereafter, in a second step S2, the parking disk 15, together with the installed engagement spring 13, is inserted between two bearing seats 2b, 2c of the transmission housing 2 of a transmission 1, which includes the parking lock device 9, until the sleeve section 27 of the parking disk 15 is aligned with the two bearing seats 2b, 2c in such a way that the actuating shaft 20 of the actuating device 19 can be inserted through the two bearing seats 2b, 2c and the sleeve section 27 of the parking disk 15.

Subsequent thereto, in a third step S3, the actuating shaft 20 connected to the manual actuator 18 is inserted into the two bearing seats 2b, 2c and the sleeve section 27 of the parking disk 15 from outside the transmission housing 2 in such a way that the manual actuator 18 is positioned outside the transmission housing 2.

Thereupon, in a fourth step S4, the engaging lever 22 of the actuating device 19 is radially slipped over a shaft inner section 20b of the actuating shaft 20 arranged within the transmission housing 2.

Finally, in a fifth step S5, the engaging lever 22 is secured on the shaft inner section 20b of the actuating shaft 20 arranged within the transmission housing 2 against unintentional disengagement, in a radial direction, from the sleeve section 27 of the parking disk 15 and/or from the actuating shaft 20.

Modifications and variations can be made to the embodiments illustrated or described herein without departing from the scope and spirit of the invention as set forth in the appended claims.

REFERENCE CHARACTERS 1 transmission
2 transmission housing
2a housing wall
2b bearing seat
2c bearing seat
3 parking interlock gear
4 parking pawl
5 output shaft
6 tooth system
7 latch bolt
8 ratchet tooth
9 parking lock device
10 interlocking element
11 connecting rod
12 interlocking element adjusting spring
13 engagement spring
14 actuator
15 parking disk
16 actuating element
17 detent device
18 manual actuator
19 actuating device
20 actuating shaft
20a shaft outer section
20b shaft inner section
20d shaft flattenings
21 recess
22 engaging lever
22a foot section
22b head section
23 projection
24 longitudinally extending channel
25 insertion channel
26 overload spring
26a spring bending section
26b spring leg
26c spring leg
27 sleeve section
27a sleeve flattening
27b sleeve flattening
28 leg
29 bore hole
30 bearing eye
30a radial wall surface
30b radial wall surface
30c internal-shell wall surface
30d internal-shell wall surface
31 mounting channel
32a disengagement safeguard
32b disengagement safeguard
32c disengagement safeguard

The invention claimed is:

1. An actuating device for manually releasing a parking lock device (9) of an automatic transmission (1) of a motor vehicle, comprising:

a manual actuator (18) arranged outside a transmission housing (2) of the transmission (1) in an installed condition of the actuating device (19);

a pivotably mounted actuating shaft (20) penetrating a housing wall (2a) of the transmission housing (2) in an installed condition of the actuating device (19), the actuating shaft (20) including a shaft outer section (20a) arranged outside the transmission housing (2) and a shaft inner section (20b) arranged within the transmission housing (2), the manual actuator (18) attached to the shaft outer section (20a);

a parking disk (15) mounted on the shaft inner section (20b), the parking disk (15) comprising a recess (21);

an engaging piece mounted on the shaft inner section (20b), the engaging piece comprising a projection (23) engaging into the recess (21) of the parking disk (15), wherein the engaging piece is an engaging lever (22) which includes a foot section (22a), the engaging lever (22) mounted on the shaft inner section (20b) of the actuating shaft (20) with the foot section (22a) of the engaging lever (22), the engaging lever (22) includes the projection (23) on a head section (22b) positioned opposite the foot section (22a).

2. The actuating device of claim 1, wherein the engaging lever (22) is bent such that the projection (23) is offset from a plane of the foot section (22a) of the engaging lever (22) via a bent portion.

3. The actuating device of claim 1, wherein the engaging lever (22) is formed of stamped and bent sheet-metal, and the projection (23) is formed by a bent-over end of the head section (22b) of the engaging lever (22).

4. The actuating device of claim 1, wherein the recess (21) comprises a longitudinally extending channel (24), the channel (24) extending circumferentially across a sector within the parking disk (15) and transitioning into a radially extending insertion channel (25) such that the recess (21) of the parking disk (15) is open at an edge in such a way that the projection (23) of the engaging lever (22) is radially insertable into the longitudinally extending channel (24) of the recess (21) through the insertion channel (25).

5. The actuating device of claim 1, wherein:
the foot section (22a) of the engaging lever (22) comprises a bearing eye (30) configured for pivotably mounting the engaging lever (22) on one or both of the actuating shaft (20) and a sleeve section (27) of the parking disk (15); and
the bearing eye (30) is open at an edge by way of a radially extending mounting channel (31) in the foot section (22a) of the engaging lever (22) such that the engaging lever (22) is slipable over one or both of the actuating shaft (20) and the sleeve section (27) of the parking disk (15) in a radial mounting direction via the mounting channel (31).

6. The actuating device of claim 5, wherein:
the bearing eye (30) comprises a first radial wall surface (30a) facing an actuation direction and a second radial wall surface (30b); and
the first and second radial wall surfaces (30a, 30b) are configured for rotationally supporting the engaging lever (22) on two opposed sleeve flattenings (27a, 27b) of the sleeve section (27) of the parking disk (15) that correspond to the first and second radial wall surfaces (30a, 30b) of the engaging lever (22).

7. The actuating device of claim 5, wherein:
the bearing eye (30) comprises two opposed internal-shell wall surfaces (30c, 30d) aligned in parallel; and
the two opposed internal-shell wall surfaces (30c, 30d) are configured for rotationally supporting the engaging lever (22) on two opposed shaft flattenings (20d) of the actuating shaft (20) corresponding to the two opposed internal-shell wall surfaces (30c, 30d) of the engaging lever (22).

8. The actuating device of claim 5, wherein the engaging lever (22) is seated directly on the sleeve section (27) of the parking disk (15) or directly on the actuating shaft (20).

9. The actuating device of claim 1, wherein the engaging lever (22) comprises a disengagement safeguard (32a, 32b, 32c) which is configured for securing the engaging lever (22) against unintentional radial disengagement from one or both of the sleeve section (27) of the parking disk (15) and the actuating shaft (20) when the engaging lever (22) is slipped over one or both of the sleeve section (27) of the parking disk (15) and the actuating shaft (20).

10. The actuating device of claim 1, further comprising an overload spring (26) arranged outside the transmission housing (2) and configured for resiliently coupling the projection (23) of the engaging lever (22) to the parking disk (15) via the overload spring (26) when the manual actuator (18) is moved in a manual release direction of the parking lock device (9).

11. The actuating device of claim 1, further comprising an overload spring (26) arranged within the transmission housing (2) and configured for resiliently coupling the projection (23) of the engaging lever (22) to the parking disk (15) via the overload spring (26) when the manual actuator (18) is moved in a manual release direction of the parking lock device (9).

12. The actuating device of claim 11, wherein:
the overload spring (26) is a bending spring including a spring bending section (26a) and two spring legs (26b, 26c);
the spring bending section (26a) is guided around one or both of a sleeve section (27) of the parking disk (15) and the actuating shaft (20) at least over a partial circumference; and
one of the two spring legs (26b, 26c) extends into the recess (21) such that the projection (23) of the engaging lever (22) rests against the one spring leg (26b) in the event of a manual movement of the manual actuator (18).

13. A parking lock device (9), comprising:
an interlocking element (10) displaceably mounted on a connecting rod (11), the interlocking element (10) configured for moving a parking pawl (4) of an automatic transmission (1) of a motor vehicle such that the parking pawl (4) engages into a tooth system (6) of a parking interlock gear (3) of the transmission (1) in a form-fit manner in an engaged condition of the parking lock device (9) and the parking pawl (4) is disengaged from the tooth system (6) in a disengaged condition of the parking lock device (9);
an interlocking element adjusting spring (12) arranged on the connecting rod (11), the interlocking element adjusting spring (12) preloading the interlocking element (10) in an engagement direction into the engaged condition of the parking lock device (9);
an engagement spring (13) pressing the connecting rod (11) into the engaged condition of the parking lock device (9) in the engagement direction of the interlocking element (10);
an actuator (14) configured for selectively moving the connecting rod (11) counter to the engagement direction in order to bring the interlocking element (10) into the disengaged condition of the parking lock device (9), the actuator (14) comprising an actuating device (19), the actuating device (19) comprising
a manual actuator (18) arranged outside a transmission housing (2) of the transmission (1),
a pivotably mounted actuating shaft (20) penetrating a housing wall (2a) of the transmission housing (2), the actuating shaft (20) including a shaft outer section (20a) arranged outside the transmission housing (2) and a shaft inner section (20b) arranged within the transmission housing (2), the manual actuator (18) attached to the shaft outer section (20a),
a parking disk (15) mounted on the shaft inner section (20b), the parking disk (15) configured for coupling the actuator (14) to the connecting rod (11), the parking disk (15) comprising a recess (21), an engaging piece mounted on the shaft inner section (20b), the engaging piece comprising a projection (23) engaging into the recess (21) of the parking disk (15), wherein the engaging piece is an engaging lever (22) which includes a foot section (22a), the engaging lever (22) mounted on the shaft inner section (20b) of the actuating shaft (20) with the foot section (22a) of the engaging lever (22), the engaging lever (22) includes the projection (23) on a head section (22b) positioned opposite the foot section (22a).

14. An automatic transmission of a motor vehicle, comprising:

a transmission housing (2);

a parking interlock gear (3) mounted in the transmission housing (2), the parking interlock gear (3) comprising a tooth system (6);

a parking pawl (4) movably mounted in the transmission housing (2), the parking pawl (4) configured for engaging the tooth system (6) of the parking interlock gear (3) in an engaged condition of the parking lock device (9) in order to lock the transmission (1); and a parking lock device (9) for actuating the parking pawl (4), the parking lock device (9) comprising an interlocking element (10) displaceably mounted on a connecting rod (11), the interlocking element (10) configured for moving the parking pawl (4) such that the parking pawl (4) engages into the tooth system (6) of the parking interlock gear (3) in a form-fit manner in an engaged condition of the parking lock device (9) and the parking pawl (4) is disengaged from the tooth system (6) in a disengaged condition of the parking lock device (9);

an interlocking element adjusting spring (12) arranged on the connecting rod (11), the interlocking element adjusting spring (12) preloading the interlocking element (10) in an engagement direction into the engaged condition of the parking lock device (9);

an engagement spring (13) pressing the connecting rod (11) into the engaged condition of the parking lock device (9) in the engagement direction of the interlocking element (10);

an actuator (14) configured for selectively moving the connecting rod (11) counter to the engagement direction in order to bring the interlocking element (10) into the disengaged condition of the parking lock device (9), the actuator (14) comprising an actuating device (19), the actuating device (19) comprising a manual actuator (18) arranged outside a transmission housing (2) of the transmission (1), a pivotably mounted actuating shaft (20) penetrating a housing wall (2a) of the transmission housing (2), the actuating shaft (20) including a shaft outer section (20a) arranged outside the transmission housing (2) and a shaft inner section (20b) arranged within the transmission housing (2), the manual actuator (18) attached to the shaft outer section (20a), a parking disk (15) mounted on the shaft inner section (20b), the parking disk (15) configured for coupling the actuator (14) to the connecting rod (11), the parking disk (15) comprising a recess (21), an engaging piece mounted on the shaft inner section (20b), the engaging piece comprising a projection (23) engaging into the recess (21) of the parking disk (15), wherein the engaging piece is an engaging lever (22) which includes a foot section (22a), the engaging lever (22) mounted on the shaft inner section (20b) of the actuating shaft (20) with the foot section (22a) of the engaging lever (22), the engaging lever (22) includes the projection (23) on a head section (22b) positioned opposite the foot section (22a).

15. A method for assembling the actuating device (19) of claim 1, comprising:

slipping an engagement spring (13) onto a sleeve section (27) of the parking disk (15), the engagement spring (13) configured for pushing the parking disk (15) into the engaged condition of the parking lock device (9) in the engagement direction of the interlocking element (10), inserting the parking disk (15), together with the engagement spring (13), between two bearing seats (2b, 2c) of the transmission housing (2) until the sleeve section (27) of the parking disk (15) is aligned with the two bearing seats (2b, 2c) such that the actuating shaft (20) of the actuating device (19) is insertable through the two bearing seats (2b, 2c) and the sleeve section (27) of the parking disk (15);

inserting the actuating shaft (20) connected to the manual actuator (18) into the two bearing seats (2b, 2c) and the sleeve section (27) of the parking disk (15) from outside the transmission housing (2) in such a way that the manual actuator (18) is positioned outside the transmission housing (2);

radially slipping the engaging lever (22) of the actuating device (19) over the shaft inner section (20b) of the actuating shaft (20) arranged within the transmission housing (2); and securing the engaging lever (22) on the shaft inner section (20b) of the actuating shaft (20) arranged within the transmission housing (2) against unintentional radial disengagement from one or both of the sleeve section (27) of the parking disk and the actuating shaft (20).

* * * * *